United States Patent [19]
Malone et al.

[11] 3,860,874
[45] Jan. 14, 1975

[54] RECEIVER FOR DESK SIGNALS

[75] Inventors: James T. Malone, Syracuse; Richard L. Brennan, Marietta, both of N.Y.; Donald D. Hallock, Sandy, Oreg.

[73] Assignee: The United States of America as represented by the Secretary of the Navy, Washington, D.C.

[22] Filed: Dec. 4, 1973

[21] Appl. No.: 421,568

[52] U.S. Cl. ...................... 325/320, 178/88, 325/30
[51] Int. Cl. ........................................... H04l 27/14
[58] Field of Search ...... 325/30, 320; 178/88, 66 R, 178/66 A; 329/104, 110, 116

[56] References Cited

UNITED STATES PATENTS 2,999,925 9/1961 Thomas ............................. 325/320
3,270,285 8/1966 Thomas ............................. 325/320

*Primary Examiner*—Benedict V. Safourek
*Assistant Examiner*—Jin F. Ng
*Attorney, Agent, or Firm*—R. S. Sciascia; L. I. Shrago

[57] ABSTRACT

Apparatus for receiving double frequency shift keying signals (DFSK) employs a phase locked loop as the frequency discriminator for tracking the four frequency states. A floating detector establishes reference voltage levels for a trio of comparators which form a binary code indicative of the number of these levels exceeded by the input signal. This code is converted by logic into mark and space signals which are held in a register until transferred to the output devices by a strobe signal.

10 Claims, 4 Drawing Figures

RECEIVER FOR DESK SIGNALS

The present invention relates generally to frequency-shift communication systems and, more particularly, to apparatus for receiving double frequency shift transmissions.

Double frequency shift keying (DFSK) is a technique of multi-channel transmission consisting of two canals of simultaneously frequency shift key channels which are combined to produce four separated keyed frequencies an audio distance apart. The double frequency shift keyed carrier frequency is shifted each time a change of condition between mark and space occurs in either of the two canals. Each of the four frequencies represents a mark or a space condition in both canals. This particular type of keying, which may be considered an advance form of FSK, allows a certain degree of coding while increasing the channel capacity of the transmitter. Representation of DFSK can be conveniently described through the use of a standard truth table such as

TABLE 1

| Transmitted Frequency | Canal 1 | Canal 2 |
|---|---|---|
| $f_1$ | *m* | *m* |
| $f_2$ | *m* | *s* |
| $f_3$ | *s* | *s* |
| $f_4$ | *s* | *m* |

The difference in frequency or shift between levels is given by $$\Delta f = f_1 - f_2 = f_2 - f_3 = f_3 - f_4$$

Shifts of interest range from $$\Delta f = 100 \text{ Hz to } \Delta f = 1 \text{ kHz}$$

It is accordingly a primary object of the present invention to provide a system for detecting double frequency shift keyed transmissions.

Another object of the present invention is to provide a DFSK detector which utilizes a phase locked loop as a frequency discriminator and a floating reference voltage detector which avoids the necessity of precisely tuning the system to the radio frequency signal of interest and of having to know the precise frequency shift.

Another object of the present invention is to provide a double DFSK detector wherein the information that is being transmitted is related to the presence or absence of four discrete frequencies and not to the absolute values of these frequencies or their interrelationships.

Other objects, advantages and novel features off the invention will become apparent from the following detailed description of the invention when considered in conjunction with the accompanying drawings wherein.

Briefly, and in general terms, receiving apparatus of the present invention converts the four frequency states of the DFSK transmission into corresponding voltage levels. This is accomplished by a phase locked loop which serves as a frequency discriminator. Thereafter, a floating detector establishes appropriate threshold reference voltages for a trio of comparators which monitor the frequency analog voltage and provide indications whenever these thresholds are exceeded. In this manner, the frequency shifts are converted to a three-bit digital word. Thereafter, those frequency states which are equivalent in terms of information content are combined, and a keyed output is produced on the two canals.

Figure 1:
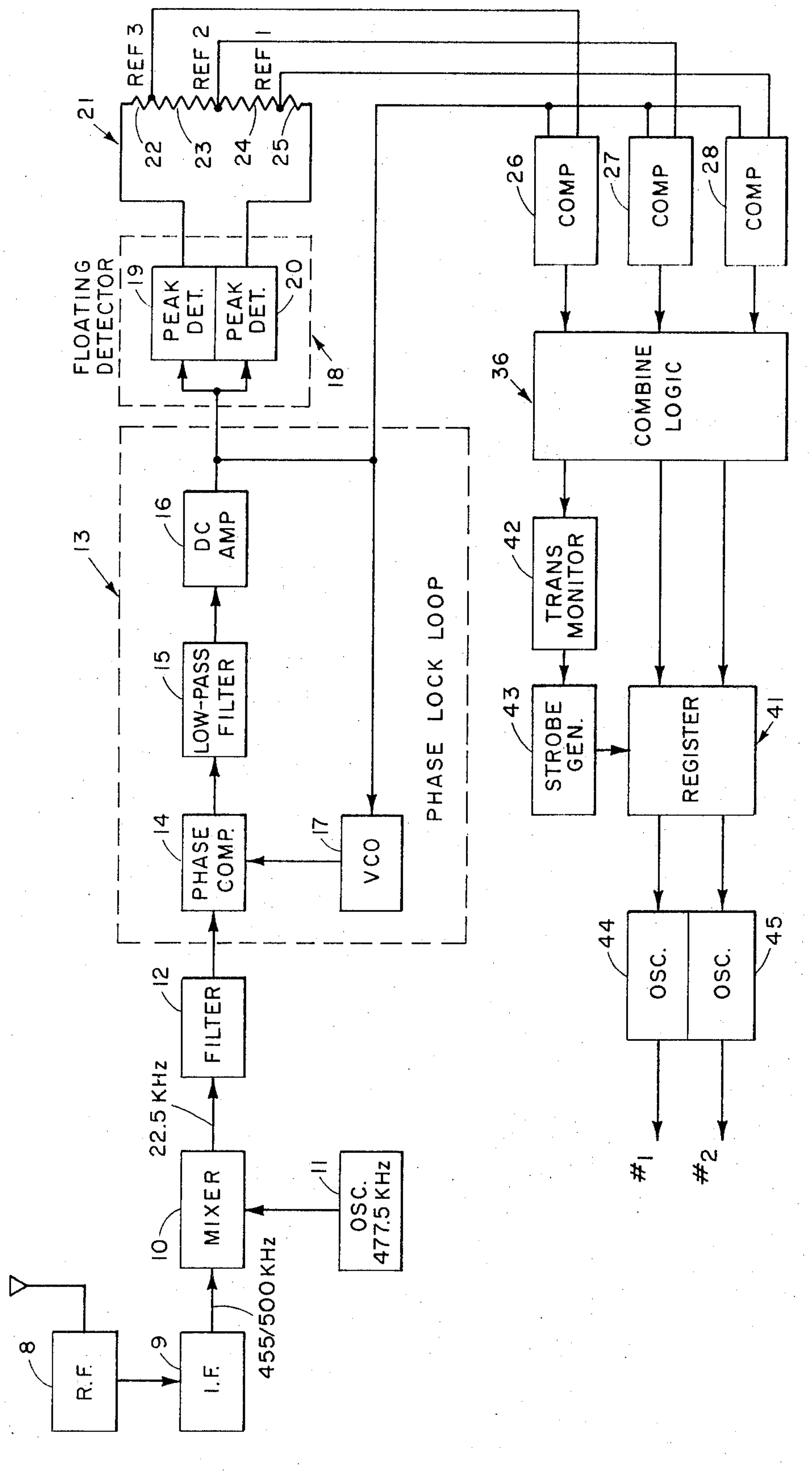
FIG. 1 is a block diagram showing the general arrangement of the overall system.

Referring now to FIG. 1, the input to the system which may be derived from a standard radio IF circuit and may consist, for example, of signals centered about either a 455 or 500 kHz frequency is applied to a mixer 10 which has as its other input a locally generated 477.5 kHz signal obtained from oscillator 11. In either case, an IF signal at 22.5 kHz is produced and subjected to appropriate filtering before being fed to the input of a phase locked loop 13. This loop, as is well known, consists of a phase comparator 14, a low pass filter 15, DC amplifier 16 and a voltage control oscillator 17 interconnected in a closed loop configuration. The operation of this aspect of the system is well known and, consequently, is believed necessary to merely point out at this time that this loop functions as a frequency discriminator and provides an output voltage whose magnitude is related to the particular frequency being received.

The output of the phase locked loop 13 is coupled to a floating limit detector 18 which consists of a pair of peak detectors which monitor the highest and lowest voltage excursions from the loop. In this connection, peak detector 19 develops an output signal which corresponds to the highest voltage level while companion peak detector 20 develops a voltage which corresponds to the lowest level. The charge times for these detectors is less than 1 millisecond. However, their discharge times are on the order of 25 seconds so as to provide sufficient memory during those signal periods when the highest and lowest voltages do not occur.

Figure 2:
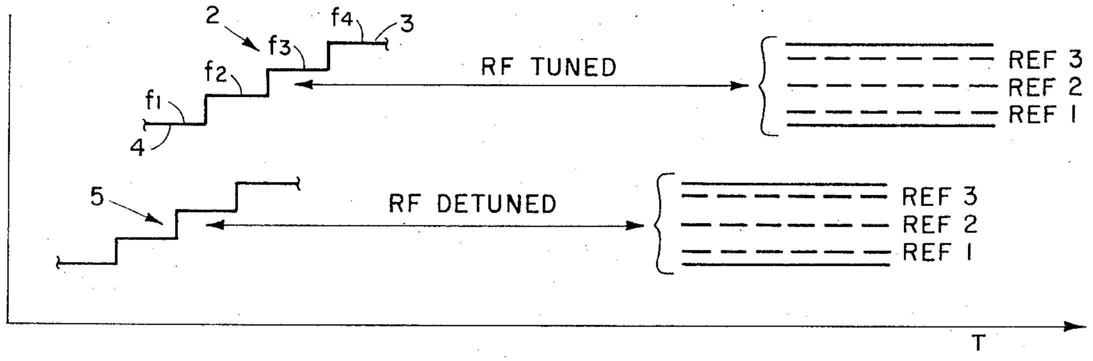
FIG. 2 illustrates an operating principle of the floating detector.

The signal from peak detector 19 is applied to one end of a resistance voltage divider 21 while the signal from peak detector 20 is applied to the other end thereof. Voltage divider 21 is subdivided into four resistance sections 22, 23, 24, 25, and the respective magnitudes of these sections are in a 1, 2, 2, 1 proportion. The reason for this selection of values will be appreciated by referring now to FIG. 2 which illustrates the situation where the DFSK signal consists of the sequence $f_1$, $f_2$, $f_3$, $f_4$ with $f_1$ representing the lowest frequency and $f_4$ the highest frequency of this signal combination. If the receiver is properly tuned to the RF signal then the staircase signal 2 will be produced at the output of the phase locked loop. Peak detector 19 will apply a voltage corresponding to 3 to one end of the voltage divider 21 while peak detector 20 will apply the voltage corresponding to 4 to the lower end of this network.

Various threshold voltage levels previously referred to which are used in the comparators are selected so as to be midway between each of the frequency transitions, that is, between $f_1$ and $f_2$, between $f_2$ and $f_3$ and between $f_3$ and $f_4$. Thus, to establish these threshold levels as seen in the right-hand side of FIG. 2, the resistance divider should be subdivided in accordance with the distances shown between line 1, the three dotted lines below line 1 and line 2. In other words, this spatial relationship is a true analog of the resistance circuit, and it will be seen that these distances follow the same 1, 2, 2, 1 relationship.

When the receiver is detuned, it will be pointed out, the lower staircase signal 5 is obtained. However, despite the fact that the limits of the signal now obtained from peak detectors 19 and 20 are of a lower magnitude, the threshold reference voltages will still have values corresponding to the midpoints of the three steps. It should be recognized that the height of each step is determined by the magnitude of the audio frequency separation between the various frequencies $f_1$ $f_2$ as established at the transmitting equipment. Thus, the system up to this point permits tracking of the frequency analog as the RF signal is tuned through the receiver passband. This allows correct demodulation independent of tuning.

The three reference threshold voltages derived from resistor divider 21 are fed to comparators 26, 27 and 28 which have as their common inputs the signal appearing at the output of the phase locked loop 13. Thus, when $f_1$ is present and none of the thresholds crossed, the output of comparators 28, 27 and 26 corresponds to the binary signal 0,0,0, respectively. When $f_2$ is present, the signal is 1,0,0; $f_3$ — 1,1,0 and $f_4$ — 1,1,1.

Figure 3:
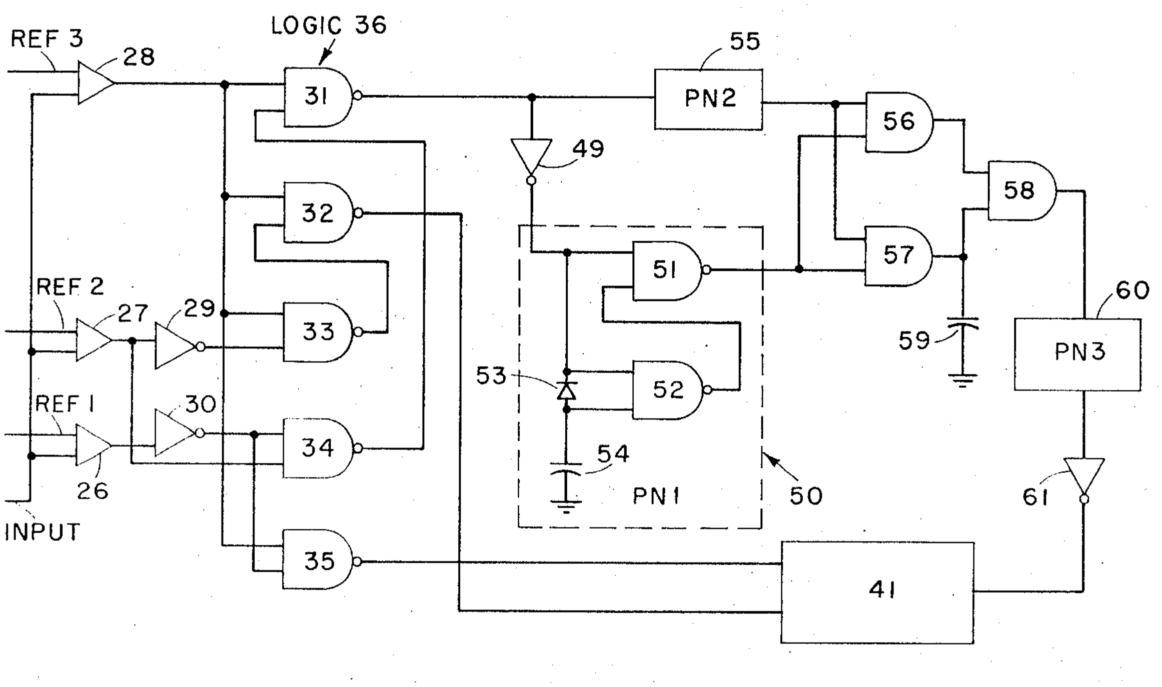
FIG. 3 is the schematic diagram of a portion of the system showing the combine logic and strobe generating provision.

The three outputs of the comparators are applied to combine logic circuit 36. As shown in FIG. 3, comparator 28 is coupled directly to one input of four NAND gates 31, 32, 33, 35. Comparator 27 is coupled directly to one input of NAND gate 34 and through an inverter 29 to one input of NAND gate 33. Comparator 26 to an inverter 30 and then to one input of NAND gates 34 and 35. The output of NAND gate 33 provides the other input of NAND gate 32 while that of NAND gate 34 provides the other input to NAND gate 31.

The outputs of NAND gates 32 and 35, which carry the two canal signals, are coupled to a register 41 while the output of NAND gate 31 feeds a transition monitor 42 and strobe generator 43 which controls the transfer of information from this register to the output devices.

When $f_1$ is present and the binary code 0,0,0 appears at the output of the three comparators, the conditions at the upper and lower inputs of NAND gate 31 will be 0,1; those at NAND gate 32, 0,1; those at NAND gate 33, 0.1; those at NAND gate 34, 1,0; and those at NAND gate 35, 0,1. Thus, the signal outputs of NAND gates 32 and 35 will both be 1. A 1 will also appear at the output of NAND gate 31.

When $f_2$ is present and the output of the comparators is 1,0,0, the conditions at the same NAND gates will change to 1,1 — 1,0 — 1,1 — 1,0 — 1,1. The output of NAND gates 32 and 35 will shift to 1 and 0. And that of NAND gate 31 to 0.

When $f_3$ is present and the binary signal 1,1,0 is produced, the conditions at these same gates will change to 1,0 — 1,1 — 1,0 — 1,1 — 1,1. The outputs from NAND gates 32 and 35 will be 0 and 0. That from NAND gate 31 will shift to 1.

And, finally, when $f_4$ is present and code 1,1,1 is produced, the conditions will be 1,1 — 1,1 — 1,0 — 0,1 — 1,0. The outputs from NAND gates 32 and 35 will now be 0 and 1. That from gate 31 will change to 0.

The following table summarizes this aspect of the system:

TABLE 2

| Inputs to Comparators | Inputs to Combine Logic | Outputs from Combine Logic | Trans. Monitor |
|---|---|---|---|
| $f_1$ | 0 0 0 | 1 1 | 1 |
| $f_2$ | 1 0 0 | 1 0 | 0 |
| $f_3$ | 1 1 0 | 0 0 | 1 |
| $f_4$ | 1 1 1 | 0 1 | 0 |

The transition monitor 42 senses each shift of frequency that is from $f_1$ to $f_2$,$f_3$ to $f_4$ or $f_3$ to $f_2$, for example. This detection, as will be seen, is utilized to control the operation of a register 41 so as to eliminate any spurious signal conditions brought about by the time it takes for the transmitter to shift between frequencies or for the phase locked loop to track these frequency changes.

Figure 4:
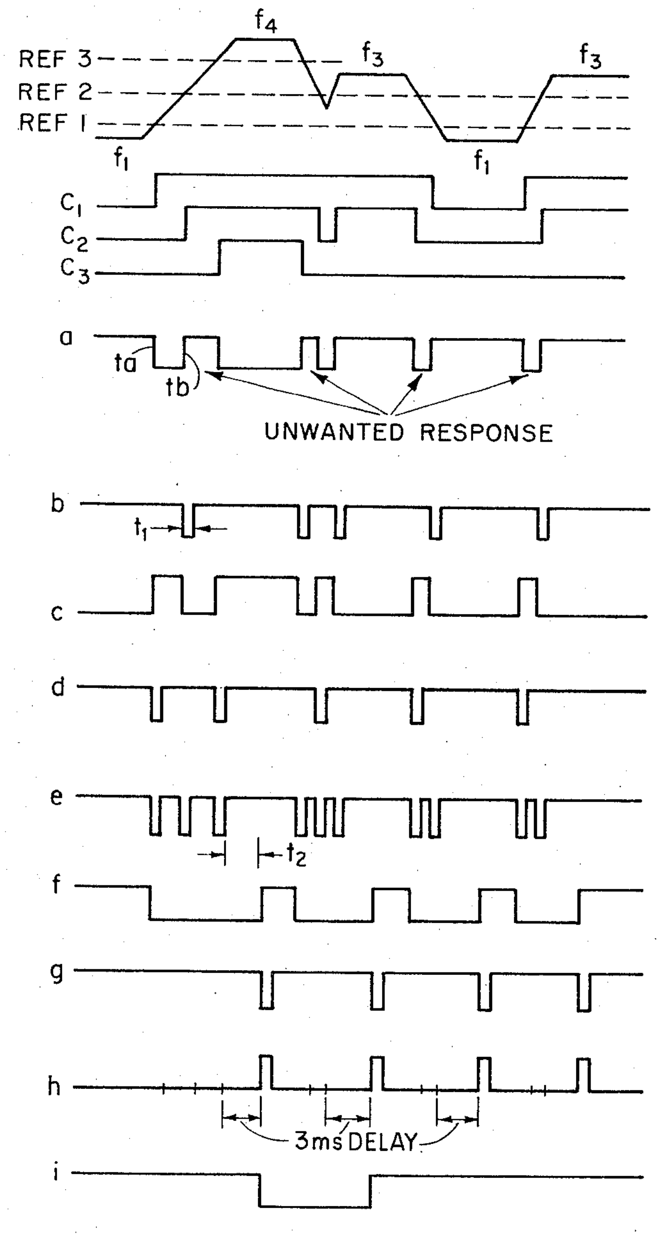
FIG. 4 illustrates how spurious signals may be developed and the manner in which the strobe generator eliminates these signals.

Referring now to FIG. 4, it will be seen that as the signal changes, for example, from $f_1$ to $f_4$ to $f_3$ and back to $f_1$, unwanted responses are produced at the receiver when certain of the threshold levels are crossed. These responses are eliminated, as noted above, by controlling the register so that the information stored therein is transferred to the output only when a strobe pulse occurs.

One type of undesirable response is the spurious signal which is created from frequency transitions which are greater than one level of frequency shift. A second type may arise from transient frequency shifts occurring at the DFSK transmitter. This second effect is represented by the overshoot which occurs when the signal switches from $f_4$ to $f_3$, as shown in FIG. 4.

Referring again to FIG. 3, the output of NAND gate 31 of the combine logic 36 is fed through an inverter 49 to a first pulse narrower 50 and directly to a second pulse narrower 55. Each of these pulse narrowers may, as shown in FIG. 3, consist of a pair of NAND gates such as 51 and 52 with a diode connected between the inputs of the latter gate and a capacitor 54 connected between the cathode of this diode and ground. The inverted signal 49 is applied directly to the upper input of both NAND gates, while the output of NAND gate 52 serves as the lower input to NAND gate 51.

Each of the pulse narrowers responds only to a 0 to 1 transition. Thus, the signal from NAND gate 31 is subdivided into two channels with one containing an inverter. In this way, the system senses each transition from 0 to 1 or 1 to 0.

When the wave form applied to pulse narrower 50 corresponds, for example, to that shown in line a of FIG. 4, a 1 is initially present at the upper input of NAND gate 51, both inputs of NAND gate 52 and a 0 is present at the lower input of NAND gate 51. Thus, a 1 is present at the output of a pulse narrower as shown in line *b.* When a transition to 0 occurs at the input at $t_a$, capacitor 54 quickly discharges and a 0 appears at both inputs of NAND gate 52 and a 1 at the lower input of NAND gate 51. Consequently, the output of the narrower persists at the 1 level. It stays at this level until the next transition occurs at time $t_b$. This transition is a 0 to 1, as seen in FIG. 4, representing the leading edge of a first unwanted response. Thus, although the upper input of NAND gate 52 changes to a 1, the lower input remains 0. Gate 52, therefore, continues to develop a 1 at the lower input of gate 51, and a 0 now appears at the output of the narrower. After a short time period t $_1$, the lower input of NANd gate 52 attains a 1 state by charging capacitor 54 through NAND gate 52. This causes the lower input of NAND gate 51 to switch to 0, returning the output of 51 to the 1 state.

The other pulse narrower has the wave form *c* applied to it which is the inverse of *a*. Its first transition is a 0 to 1, and, consequently, it responds to this portion of the signal by producing a 0 pulse of width $t_1$ in line *d*.

If the analysis is continued, it will be found that pulse narrowers 50 and 55 produce the wave forms shown in line *b* and *d*. Thus, each transition, whether a 1 to 0 or 0 to 1, develops a corresponding short length 0 pulse of duration $t_1$.

The outputs of the narrowers are applied to a pair of AND gates 56 and 57 which are connected to a third AND gate 58. A capacitor 59 is connected between the lower input of this AND gate and ground. The purpose of this capacitor, as will be seen, is to stretch each 0 pulse and by doing so eliminating those short 0 pulses which occur within a predetermined time interval after a 0 to 1 transition. As indicated above, the wave forms *b* and *d* are present at the input of both AND gates 56 and 57. Thus, the wave form *e* appears at the output of NAND gate 56. When the first transition in this wave form, the 1 to 0 occurs, capacitor 59 is discharged. It stays discharged throughout $t_1$, and when the next transition, the 0 to 1, occurs, it slowly charges through the internal path of AND gate 58. However, the parameters of the system are selected so that it does not attain a 1 state until a predetermined time has elapsed. Consequently, if a transition occurs back to the 0 before this specific time, the lower input of AND gate 58 never attains the 1 level since capacitor 59 is again discharged. This happens when the second 0 pulse appears in line *e* and, again, at the 1 to 0 transition of the third pulse in the same line. However, after this third pulse discharges capacitor 59, the next similar transition comes late enough so that the pulse narrower outputs stay in the 1 state for a sufficient time duration to allow this capacitor to charge to the 1 level. Consequently, the output of AND gate 58 goes from 0 to 1. This interval from the end of the 0 input at the upper input of AND gate 58 to the 0 to 1 transition at the output of AND gate 58, $t_2$, is made longer than the longest frequency transition time from $f_1$ to $f_4$. The reason for this is that this type of transition produces unwanted responses of the greatest duration. Thus, since the 0 to 1 transition from AND gate 58 occurs after a time interval longer than this duration and since this transition, as will be seen, identifies the time of each strobe pulse, these pulses appear only after the transition to the final state has settled.

The output of AND gate 58 corresponds to the wave form shown in line *f*, and this signal is sent to the third and last pulse narrower 60. This pulse narrower, in effect, forms a 0 pulse of short duration at the 0 to 1 transition of each input pulse. Thus, a delay of time $t_2$ following the last of a burst of transitions is introduced into the system before the production of each strobe pulse. The ouput of pulse narrower 60 is fed to inverter 61 producing these pulses as shown by the wave form of line *h*. By having these pulses control the transfer of information from the register 41 to the oscillators 44 and 45 which serve as the audio signal generating means for the canals 1 and 2 in one mode of operation, this system effectively eliminates all of the unwanted responses in line *a* and generates the final output signal, line *i*, which corresponds to mark, space, mark, mark, mark.

What is claimed is:

1. Apparatus for receiving a DFSK signal composed of intervals of $f_1$, $f_2$, $f_3$ or $f_4$ which represent progressively higher frequencies and designate mark or space signals on a pair of canals comprising in combination
- means for detecting said DFSK signals and for producing therefrom a DC signal whose amplitude is proportional to the frequencies of said DFSK signal;
- means for establishing first, second and third reference voltage levels from the DC signals produced from $f_1$ and $f_4$,
  - said first, second and third levels being between the amplitudes of the DC signals produced from $f_1$ and $f_2$, $f_2$ and $f_3$, and $f_3$ and $f_4$, respectively;
- means for developing a binary signal indicative of the number of said levels that are exceeded by the DFSK signal being detected; and
- means for converting said binary signal into two mark or space signals.

2. In an arrangement as defined in claim 1 wherein said means for producing said DC signal comprises a phase locked loop functioning as a frequency discriminator.

3. In an arrangement as defined in claim 1 wherein said frequencies $f_1$, $f_2$, $f_3$ and $f_4$ are separated by equal audio frequency amounts.

4. In an arrangement as defined in claim 1 wherein said first, second and third levels are midway between the amplitudes of the DC signals produced from $f_1$ and $f_2$, $f_2$ and $f_3$ and $f_3$ and $f_4$.

5. In an arrangement as defined in claim 1 wherein said means for developing said binary signal comprises
- three comparators,
  - one input of each comparator having applied thereto the DC signal produced from the DFSK signal,
  - the other input of each comparator being a different one of said reference levels,
- each of said comparators wherein said DC signal exceeds said reference level producing an output signal which forms one bit of said binary signal.

6. In an arrangement as defined in claim 1 further comprising
- a register;
- means for feeding said two mark or space signals to said register; and
- means for transferring said two mark or space signals from said register to a pair of output canals a preselected time after the occurrence of a frequency transition in said DFSK signal.

7. In an arrangement as defined in claim 1 further comprising
- means for detecting any change in the frequency of said detected DFSK signal; and
- means for feeding said two mark or space signals to said pair of canals a predetermined time after this detected change.

8. In an arrangement as defined in claim 1 wherein said means for establishing said reference levels includes
- a pair of peak detectors, one of said detectors being responsive to $f_4$ producing a DC output voltage whose magnitude is proportional thereto, the other of said detectors being responsive to $f_1$ and producing a DC output voltage whose magnitude is proportional thereto.

9. In an arrangement as defined in claim 8 wherein said means for establishing said reference levels further includes a potentiometer;

means for applying the Dc output voltages from said pair of detectors to opposite ends of said potentiometer, said potentiometer having three output taps which are located at the 1/6, ½ and 5/6 resistance points, the voltages available at said output taps corresponding to said reference levels.

10. A receiver for double frequency shift keying signals made up of $f_1, f_2, f_3$ or $f_4$ states which represent progressively higher frequency and designate mark or space conditions on a pair of output canals comprising means for detecting said DFSK signal and for developing therefrom a DC signal whose amplitude is proportional to the frequency of said detected DFSK signal;

means for comparing said DC signal with three threshold levels which are midway between two DC signals produced from $f_1$ and $f_2$, from $f_2$ and $f_3$ and from $f_3$ and $f_4$, respectively, and for generating three signals which are indicative of the number of threshold levels that are exceeded by the detected DFSK signal;

means for converting said three signals into the two designated mark or space signals represented by said DFSK signal;

a register;

means for feeding said two mark or space signals to said register; and means for transferring said mark or space signals from said register to said pair of canals only after a predetermined time interval has elapsed following a frequency shift in said detected DFSK signal.

* * * * *